United States Patent [19]
Wittrock et al.

[11] 3,977,658
[45] Aug. 31, 1976

[54] APPARATUS FOR WORKING PLASTIC MATERIALS

[75] Inventors: Ludwig Wittrock, Marl; Heinz Brand, Dorsten; Helmut König, Bovenden u. Gottingen, all of Germany

[73] Assignee: Ludwig Wittrock, Marl, Germany

[22] Filed: Feb. 25, 1975

[21] Appl. No.: 552,933

[30] Foreign Application Priority Data
Feb. 25, 1974 Germany............................ 2408936

[52] U.S. Cl................................... 259/192; 259/6
[51] Int. Cl.² ............................................ B29B 1/06
[58] Field of Search ............... 259/191, 192, 193, 6, 259/97, 5, 21, 41; 425/202, 205, 207, 208, 209

[56] References Cited
UNITED STATES PATENTS

| | | | |
|---|---|---|---|
| 3,244,408 | 4/1966 | Brownlie | 259/6 |
| 3,261,056 | 7/1966 | Fritsch | 259/192 |
| 3,751,015 | 8/1973 | Hensen | 425/205 |
| 3,861,287 | 1/1975 | Manser | 259/192 |
| 3,869,111 | 3/1975 | Matsuoka | 259/191 |

*Primary Examiner*—Robert W. Jenkins
*Attorney, Agent, or Firm*—Norman S. Blodgett; Gerry A. Blodgett

[57] ABSTRACT

Apparatus for the working of plastic materials, including three separate portions consisting of two screw pumps between which lies a conical kneading rotor having radical fingers and rotating in a cylindrical housing.

2 Claims, 5 Drawing Figures

APPARATUS FOR WORKING PLASTIC MATERIALS

BACKGROUND OF THE INVENTION

An apparatus for the working of thermoplastic raw materials and similar masses by the use of rotating masticating tools, such as worm gears or rolls, is described in U.S. Pat. No. 3,782,700. This invention is based on the function of making the thermoplastic material plastic by a physical, accurately-measured residence time. The invention is based on heating technology, so that an individual meltable particle of, for example, 0.1 mm size in a powder of raw material is weldable, plasticized, and moldable within approximately 0.3 seconds, if it is exposed on all sides to a determined melting temperature. With PVC, for example, such a temperature would be 165°C. The temperature may be selected to be considerably higher (for example, 300°C) if the particle is to be exposed to the temperature for a very short time only, without appreciable damage occuring due to thermal overloading, as with PVC. Thermoplastic material which is sensitive to integration can also be exposed for a much longer time interval (such as 20 minutes) than is necessary for melting, if it is exposed only to its necessary melting temperature, without any appreciable damage due to thermal overloading.

During the plastification of particle masses, such as raw material in powder form, it is necessary in the treating process (because of the difficulties of warming the individual particles uniformly) to exceed considerably the ideal temperature and residence time values. With known procedures and apparatus, residence times of 1 : 1000 are used which at this time still permit a satisfactory production of plastic articles.

The apparatus of the invention permits considerable improvement in the quality of the product. By the use of controlled frictional action between the individual particles in the raw material housing, a uniform external heating of the mass can take place and with it an approach as close as possible to the ideal residence time. By maintaining the ideal residence time, the relative value may be shortened even further by exposure to higher, short-term temperatures to create a reduction in the heat acting on the mass for the purpose of achieving the melting temperature.

In order to execute this procedure, it is suggested that devices be used which are designed and combined in accordance with the invention. These devices consist mainly of a plasticizing part whose rotational speed is controlled, i.e., a plasticizing apparatus with a housing and a rotor, which is designated hereinafter as a kneading housing with a first RPM-controlled feeding pump followed by an RPM-controlled exit, or compression pump. When the feed pump and exit pump are designed in such a way that the transport and compression functions are executed with the smallest possible friction heat development, the kneading housing can be designed in such a way that by the use of rotating, but not transporting, kneading devices and by the use of RPM measurements of the rotor, so much internal frictional work is introduced into the mass being moved through the apparatus that the raw mass introduced under controlled inlet pressure is first completely molten or plasticized exclusively by friction heat.

It is the function of this invention to provide for the design of apparatus for sufficiently fast procedural conditions and for the continuous transportation of the mass to be worked under controlled pressure into, through, and out of the kneading housing without wall friction and heat resistance damaging the mass by non-uniform and insufficient heat.

The invention suggests the design of the inlet and exit pumps as worm gear presses, preferably as double worm gear pumps. Double worm gear pumps working with the displacement principle do not need wall friction for performing their transport functions. The wall friction that appears with double worm gears can be maintained relatively small by designing the pump for high feeding capacities.

For an activation reactor the invertion suggests the use of a housing inside of which is arranged a kneading rotor with radial fingers, so that a cross-section allowing free flow remains. The section is so large that a rapid through-flow of the mass in the axial direction can take place without lowering the magnitude of the wall friction. The wall friction circumferentially of the kneading elements is thereby used for causing resistance in the form of shearing forces. An unprevented additional localized heating of the mass may occur without damage corresponding to the extremely large heat production by internal friction while providing larger capacity.

According to this invention, the flow capacity may be increased considerably when the wall friction (which is necessary for execution of the operation, of single worm gear pumps and of the kneading housing) is brought close to the dimension, which, by the use of this single worm gear as an element of transportation and compression work and by the use of a rotor with kneading fingers inside the kneading housing, corresponds to the necessary work to overcome the resistance on the inside housing wall of the rotor. This is because of the effective friction area of the rotating tool, especially when the feeding cross-section is designed considerably smaller than the contact surface of the stationary housing wall. Depending on different surface factors, the friction force on the housing wall is always larger than that on the tool surface when the force components in the circumferential direction are compared with the effective surface part of the gears or fingers.

Known single worm gear presses which have to perform a transporting and compressing function (for example, extrusion worm gears) are restricted in their capacity by the maximum thread thickness. The feeding capacity under pressure increases first with increasing thread thickness. However, with further increased depth above a certain dimension, depending on the worm gear diameter, the capacity grows smaller up to an efficiency equal to zero. The reason for this is that the transport function requirement for pressure worm gears, (namely, the smaller friction effect within the worm gear thread, compared to the larger friction effect within the housing part from a determined thread depth) is no longer fulfilled. With increasng thread depth, the surface of the front sides of the worm gear thread increases by the square law and creates higher friction forces than the linear reduction of the worm gear shaft surface with growing thread depth. Friction within the worm gear thread is especially reduced by the force component in the circumferential direction and this originates in the chosen pitch angle, depending on the pressure-loaded front side of the worm gear thread. The known designs of pressure worm gears are, therefore, arranged in such a way that the worm gear thread has a possible small pitch angle, which does not result in a higher thread pitch than the dimension of the worm gear diameter, to keep the friction component small in the circumferential direction. The thread depth limitation is not eliminated in that way.

In order to achieve more efficient thread depth by increasing the friction of the cylinder wall, the cylinder wall has to be roughened, equipped with grooves, or designed with a counter-running thread. Such measures, however, are expensive and they disturb the flow of material, while the thread depth limitation is expanded by only a small amount. According to experience, the thread depths on known worm gear designs cannot exceed 0.12 times the worm gear diameter, to prevent a non-allowable sliding of the transport media in the circumferential direction of the cylinder wall, resulting in an unfavorable transport effect.

According to this invention, the individual worm gears (by the use of a smooth cylinder wall for the extension of the procedure with any thread depth and only by surface proportioning of the worm gear thread) can have a smaller friction transport surface of the worm gear thread opposite the cylinder wall surface positioned thread, when a corresponding large thread pitch is available.

Tests have shown that a substantial enlargement of the common thread pitch angle will permit (in spite of the enlargement of the force component present here in the circumferential direction) considerable enlargement of the effected cover surface compared to the enlargement of the worm gear surface which is required for the frictional difference for transport functions.

These tests have shown that worm gear threads can have (in place of the common pitch of approximately the worm gear diameter) a pitch 1.5 times larger than the worm gear diameter, this being independent of the diameter and of the counter pressure, i.e., compression capacity. The thread depth can be selected in any size, so long as the imposed torsion moment is suitable to the smaller worm gear shaft based on its stress value.

Transport pumps with pressure worm gear designed according to this invention have a transportation function which is independent of viscosity and of friction factors in the plastic mass. In transporting high, viscosity media (especially powdered raw materials) a pressure effect can be experienced high enough to stall the attached drive, even larger than double worm gears and piston pumps and even with a very large thread depth. This discovery permits the capacity limits of devices for execution of the known procedures within the conventional kneading apparatus to be expanded.

By designing a corresponding small surface for the rotating kneading tool (relative to a correspondingly larger surface of the contacted stationary housing wall), it is assured that a strong localized overheating of mass particles may occur by the mass sliding too fast in the direction of the circumference of this housing and that the plastification energy introduced acts predominently by kneading of the mass particles, i.e., by internal friction. Unpreventable localized higher heating of mass particles on the surface of the kneading tool are equalized by the present intensive mixing process without having damaged the production.

By properly sizing the surface relationships, the force component of the mounted fingers circumferentially of the kneading rotor is brought into consideration. The number and shape of the fingers is also a determining factor when selecting the cutting surface of the rotor in connection with the circumferential force components present.

It has been determined by testing that the surface of the rotor (including that of the fingers and of projected areas of the fingers, as a functional condition) is at a maximum of 80% of that of the contacted housing wall surface.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
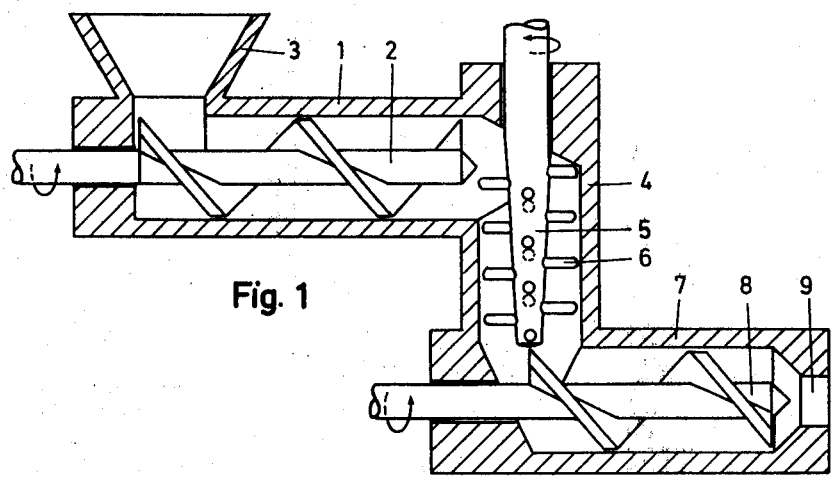
FIG. 1 is a vertical sectional view of the apparatus.

According to FIG. 1, the feeding cylinder 1 is arranged with a driven single conveyor gear 2 which is controllable. Raw material feeding is provided by the funnel 3. The worm gear 2 presses the raw material introduced by the funnel 3 through a kneading housing 4. The raw material is kneaded within the housing by a controllably-driven rotor 5 which is equipped with cutting cams or fingers 6 and, is plasticized and melted by friction heat produced by the kneading. The plasticized mass is continuously pushed by the pressure action of the worm gear 2 into an exit cylinder 7 and is pressed by a single worm gear 8 into the exit jet or passage 9 with the required compression pressure. By separate speed control of the single worm gear 2 and of the worm gear 8 within the kneading housing, any degree of feeding pressure can be provided which is necessary for the worked mass and for the additional control of the kneading work accomplished by the rotor 5.

The individual zones of the apparatus can be equipped with conventional controlled-temperature devices for external heating or cooling and for start-up or temperature programming tasks, as well as with pressure measuring and control arrangements, acting in opposition to the automatic temperature and RPM control.

Figure 2:
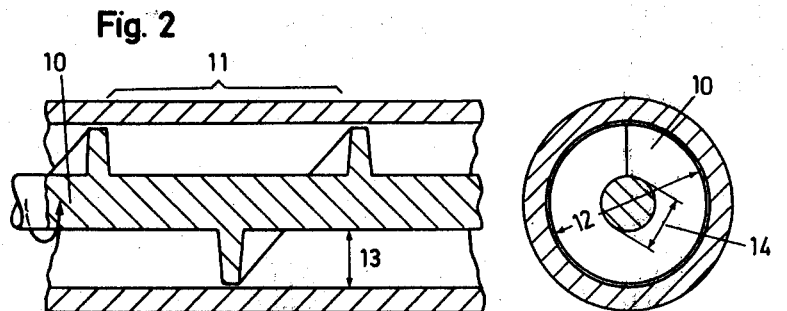
FIG. 2 is an axial sectional view of a transport and pressure worm gear.
Figure 3:
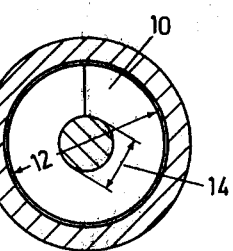
FIG. 3 is a radial sectional view of the apparatus taken through FIG. 2.

In FIGS. 2 and 3 the single worm gear 10 has a thread angle or lead 11, which is selected in such a way that it is at least 1.5 times larger than the worm gear diameter 12, whereby a thread depth 13 can be present as determined by the maximum strength allowable with the worm gear diameter 14.

Figure 4:
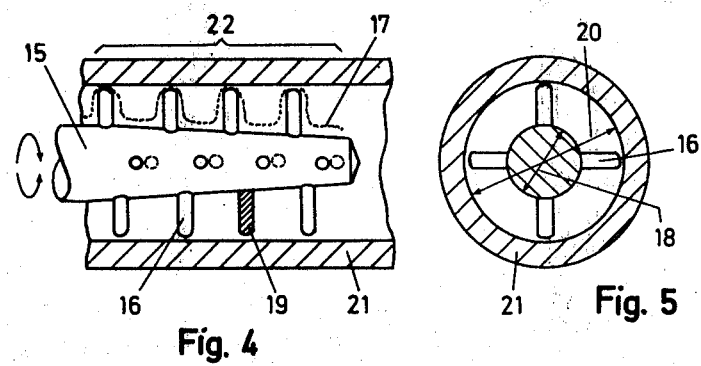
FIG. 4 is an axial sectional view of a kneading apparatus.
Figure 5:
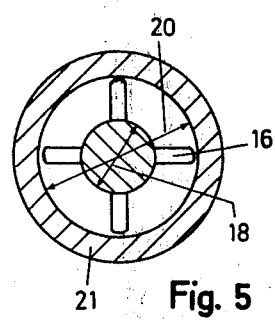
FIG. 5 is a radial sectional view of FIG. 4.

The surface of rotor 15, according to FIGS. 4 and 5 and including the cutting cams or fingers 16, is symbolized by the circumferential line 17 and by the selection of a diameter 18 of the rotor 15 and the number of fingers 16 designed in such a way that this surface is smaller (after the addition of resistance-forming projection areas 19 in the circumferential direction of the fingers 16) than the inside surface of the wall 22 corresponding to the diameter 20 of a reaction housing 21.

The design of a transport worm gear in accordance with this invention is relatively simple for the feeding and the stimulation of masses to be worked within the kneading housing, as is the design of the corresponding kneading rotor. In special cases (when no large feeding capacity is required) the elements of the apparatus for special types of raw material can be designed in such a way that the required, favorable kneading pressure for operation can be achieved by the use of feed capacities through the feed and exit pumps rather than by the desired transport effects. In such cases, separate speed controls of the individual zones can be omitted. The worm gears, as well as the kneading rotor, can then be arranged on a common shaft with a common controllable drive, or can be equipped with two separate shafts and two controllable drives.

In addition, favorable kneading pressure within the kneading housing and the transport function (with a corresponding design of transport worm gears) can be controlled by arranging an adjustable throttle within the exit passage of the kneading housing. For example, the shaft of the kneading rotor lying within the exit passage can be in the form of a cone and, by an axial displacement of the rotor shaft, the flow cross-section of the outlet opening can be varied.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for working thermoplastic raw material and similar masses through rotating kneading tools, wherein the material to be worked is introduced into a driven transport apparatus, wherein the material is softened by means of the heat which is generated by the friction developed by the kneading and the softened material is thereafter compressed by a transporting element, so that it may be formed into parts, comprising
   a. a separately controllable feeding device,
   b. a separate controllable plasticizing means arranged after the device, the plasticizing means consisting of a kneading rotor provided with radial fingers, wherein the contact surface of the rotor (15), including the surface of the radial fingers (16) and the projection areas (19), is not more than 80% of the surface of the contacted inside wall (22) of the kneading housing (21), and
   c. a separate controllable compression apparatus, wherein the compression apparatus is designed as a simple single worm gear which operates by means of a thread gradient, which gradient is larger than the worm gear diameter, is approximately 1.5 times larger, and has a thread thickness of at least 15/100 of the diameter.

2. Apparatus as recited in claim 1, wherein the rotor has a tapered surface with the small end downstream, wherein the inner surface of the housing is cylindrical, and wherein the fingers are generally cylindrical with rounded outer ends that lie close to the surface of the housing.

* * * * *